Figure 1:
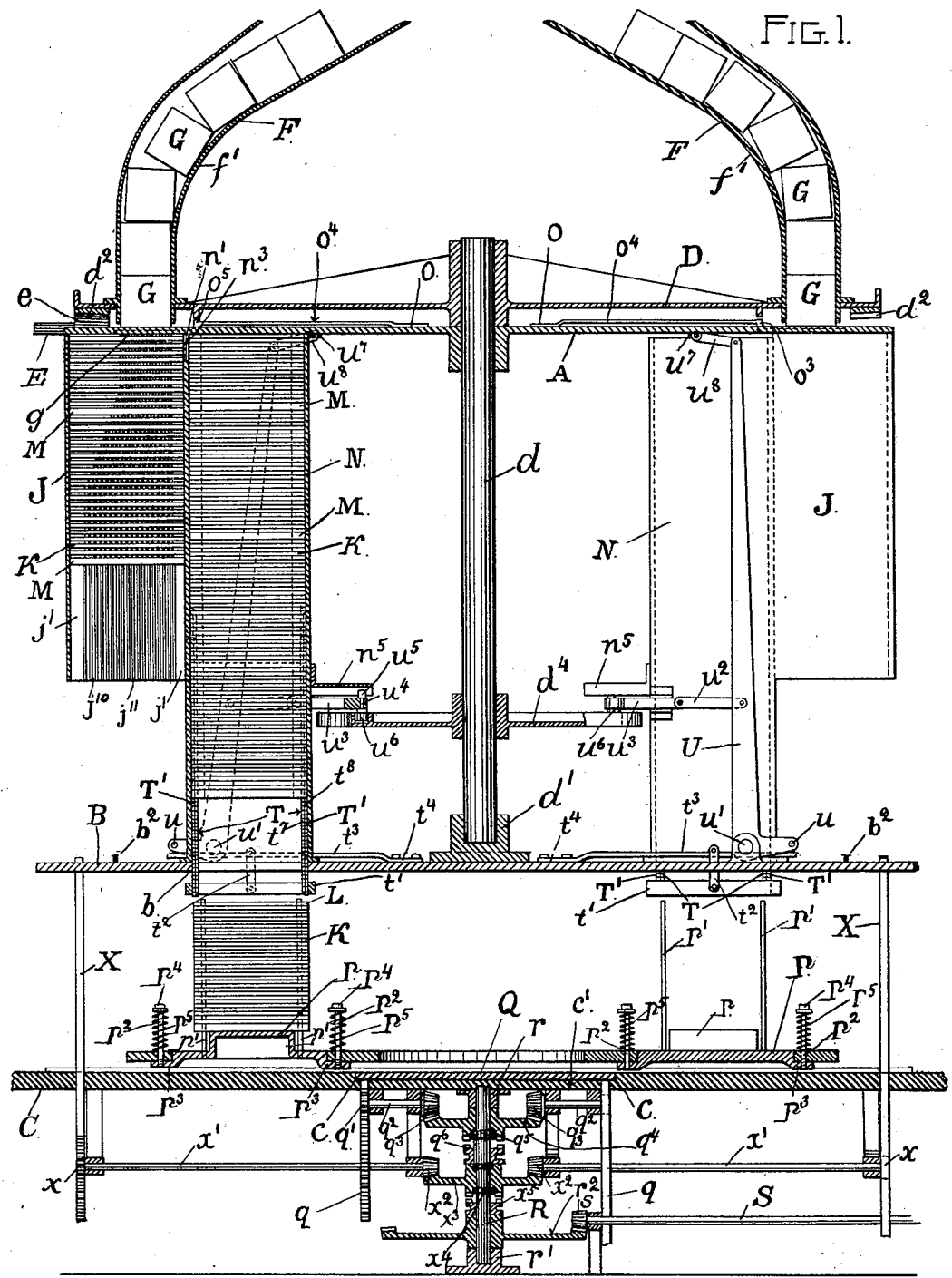

(No Model.) 10 Sheets—Sheet 1.

M. S. LEVÈ.
MACHINE FOR MAKING AND FRAMING MATCH SPLINTS.

No. 587,130. Patented July 27, 1897.

WITNESSES
Daniel Callaghan
Fabius F. Finch

INVENTOR.
Marcus S. Levè
by A. H. Ste. Marie atty (No Model.)

M. S. LEVÈ.
MACHINE FOR MAKING AND FRAMING MATCH SPLINTS.

No. 587,130. Patented July 27, 1897.

WITNESSES
Daniel Callaghan
Fabius F. Finch

INVENTOR
Marcus S. Levè
by A. H. Ste Marie
atty (No Model.) 10 Sheets—Sheet 3.
M. S. LEVÈ.
MACHINE FOR MAKING AND FRAMING MATCH SPLINTS.
No. 587,130. Patented July 27, 1897.

WITNESSES
Daniel Cauaghau
Gabius F. Finch

INVENTOR
Marcus S. Levè
by A. H. Ste Marie attʸ

(No Model.) 10 Sheets—Sheet 4.
M. S. LEVÈ.
MACHINE FOR MAKING AND FRAMING MATCH SPLINTS.
No. 587,130. Patented July 27, 1897.
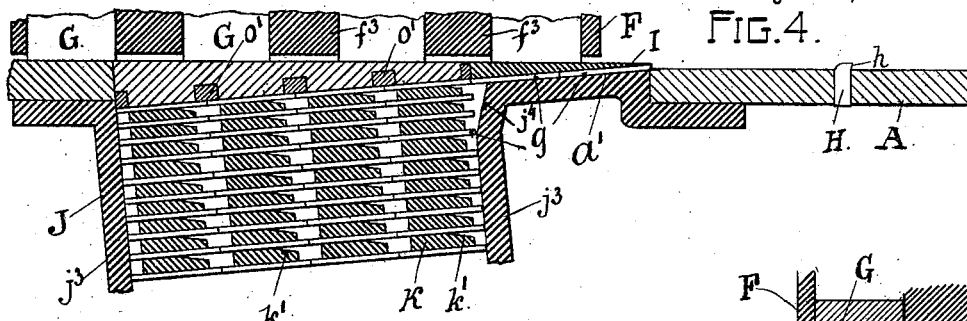
FIG. 4.
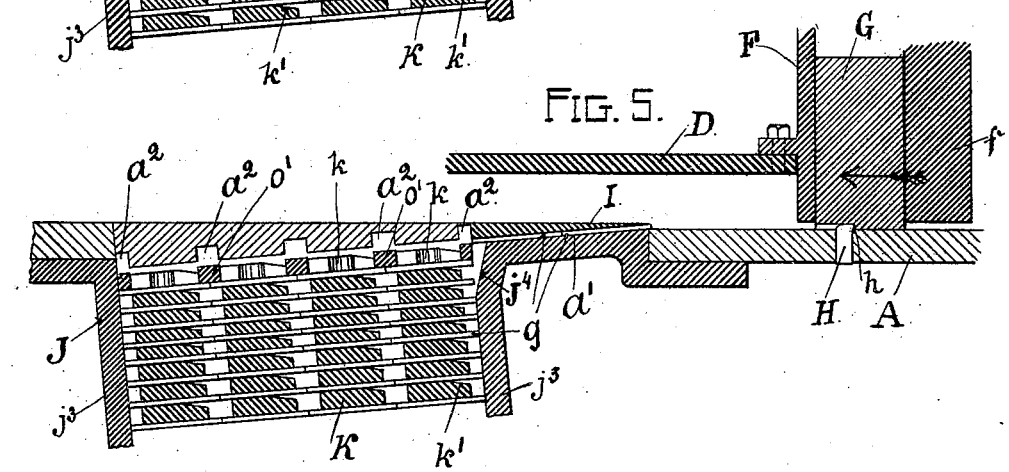
FIG. 5.
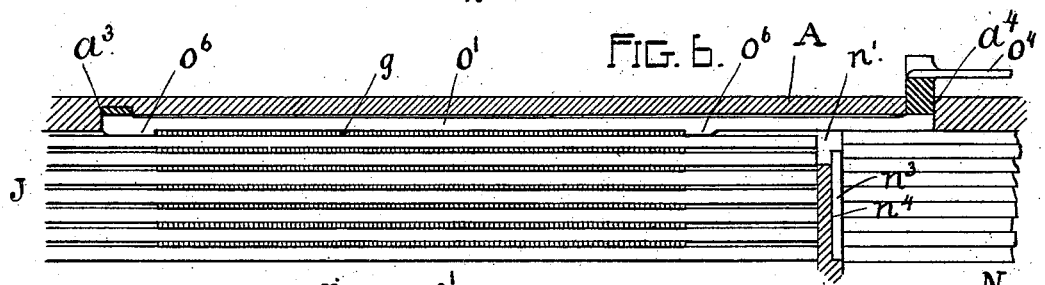
FIG. 6.
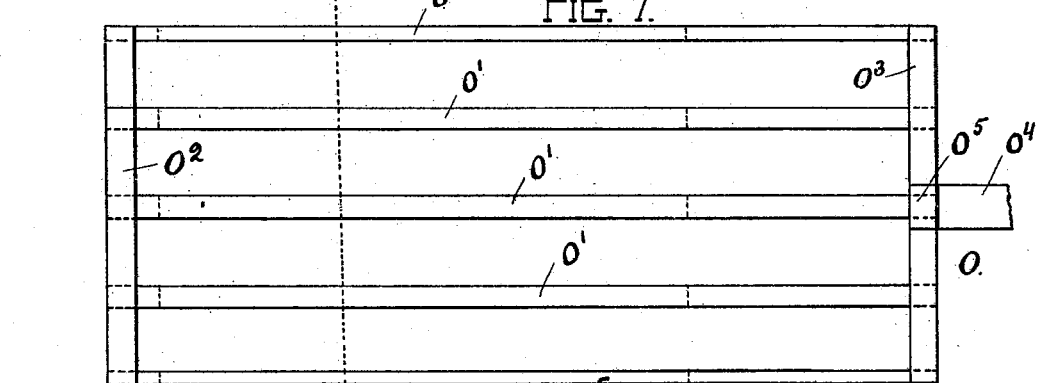
FIG. 7.
FIG. 8.
WITNESSES
D. Callaghan
Fabius T. Finch
INVENTOR
Marcus S. Levè
by A. H. Ste Marie atty
THE NORRIS PETERS CO., PHOTO-LITHO., WASHINGTON, D. C.

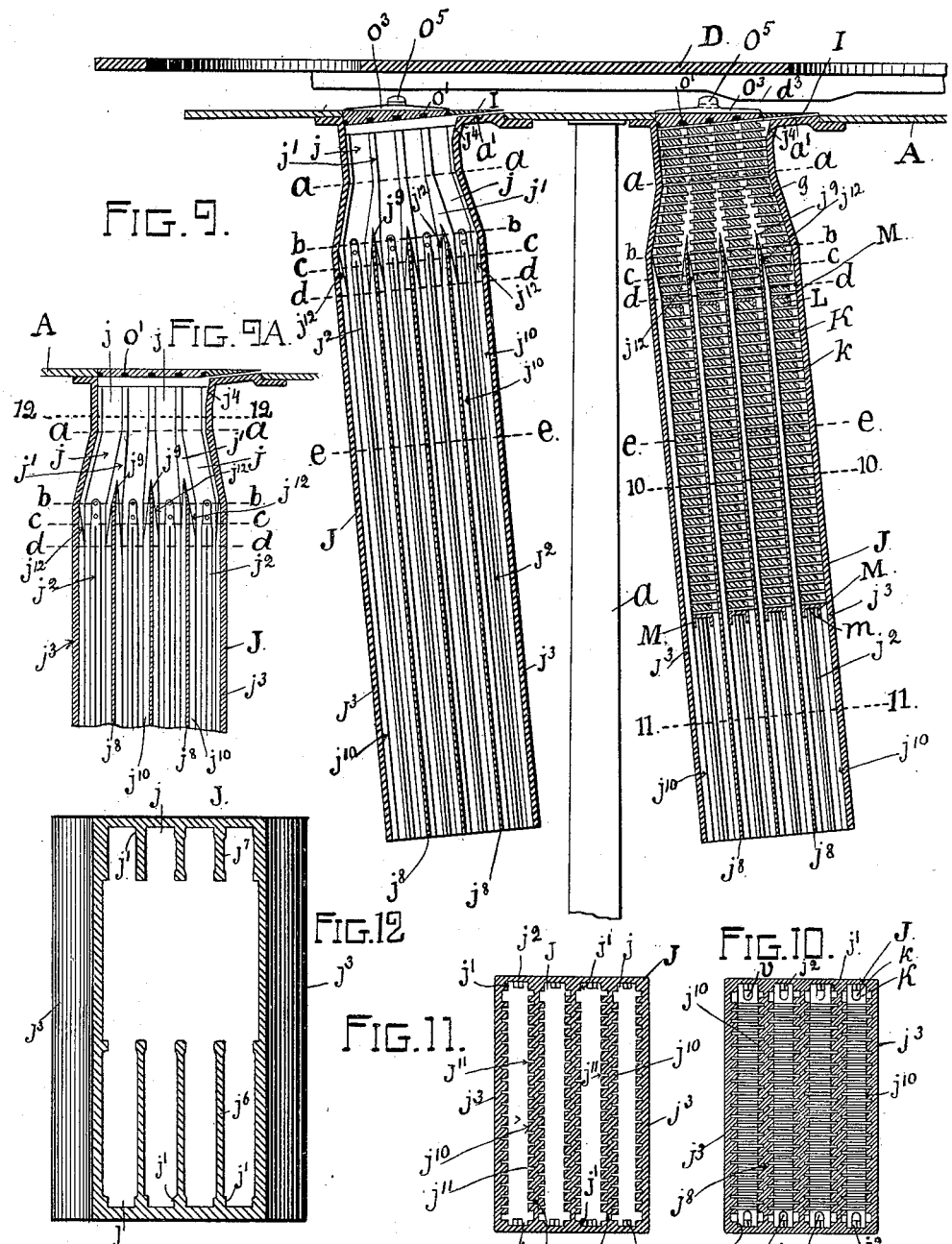

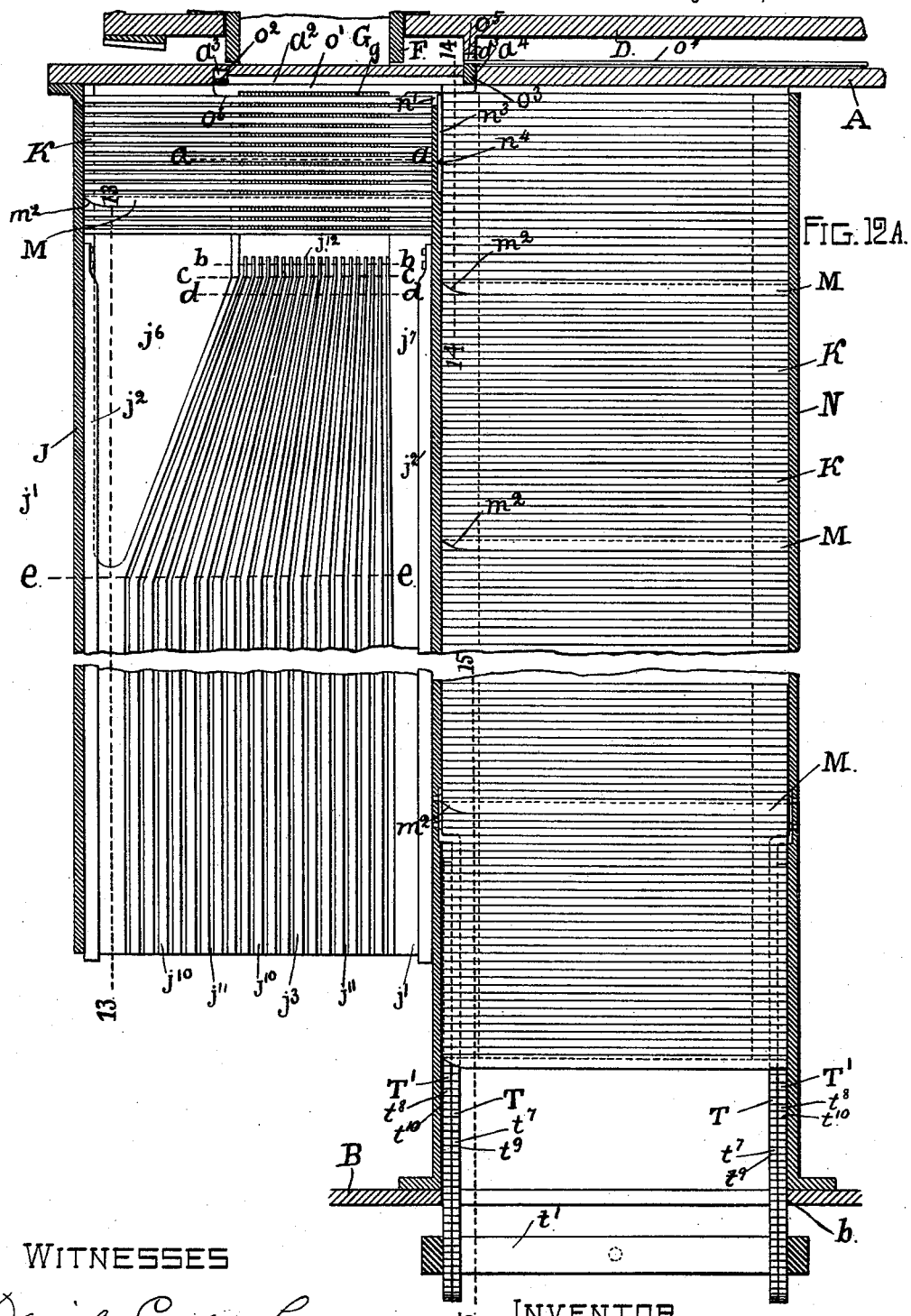

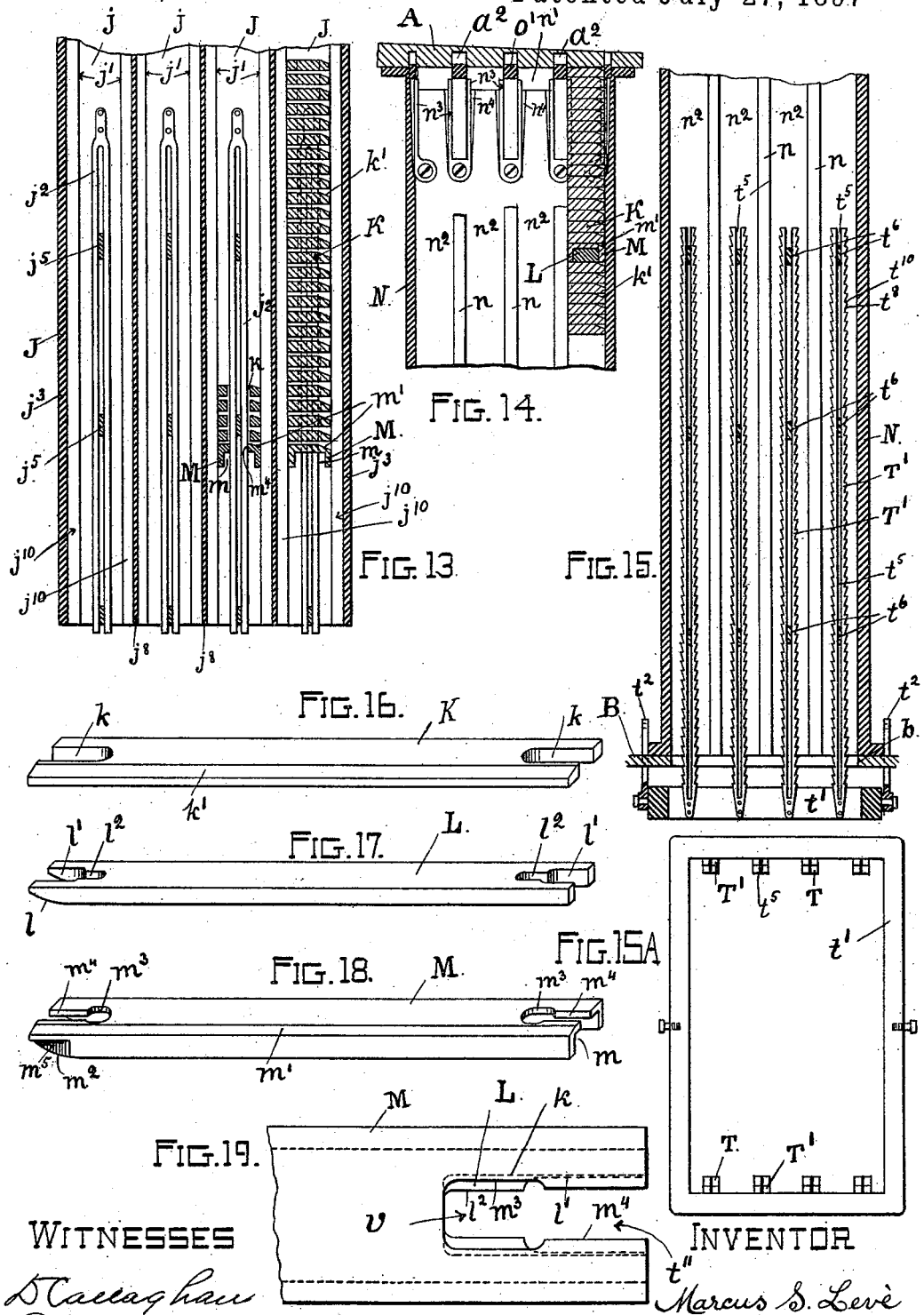

(No Model.) 10 Sheets—Sheet 8.
M. S. LEVÈ.
MACHINE FOR MAKING AND FRAMING MATCH SPLINTS.
No. 587,130. Patented July 27, 1897.
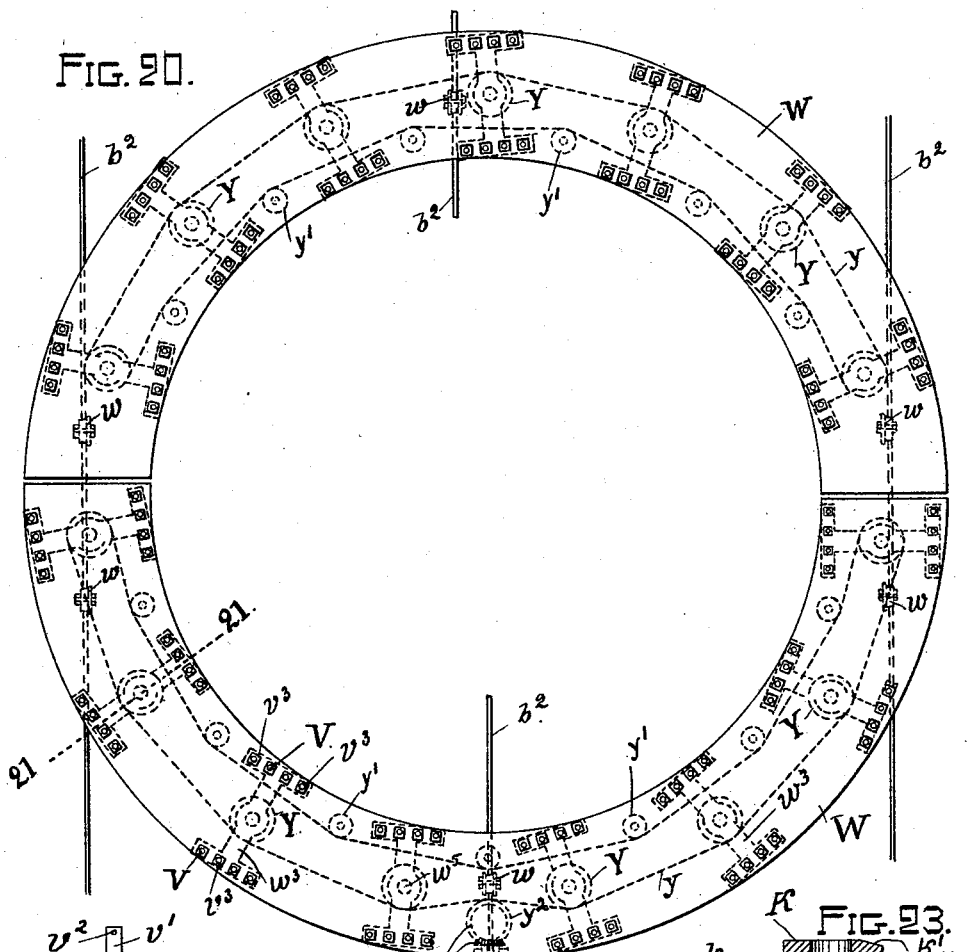
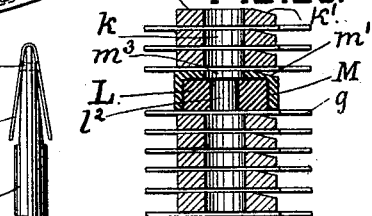
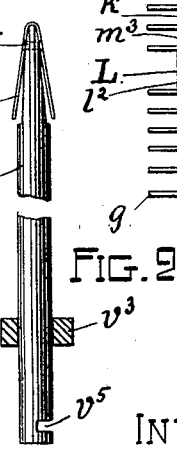
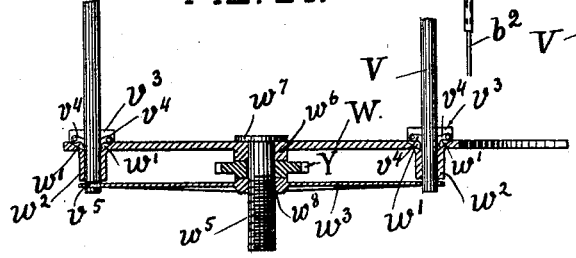
WITNESSES
Daniel Callaghan
Fabius G. Finch
INVENTOR
Marcus S. Levè
by A. H. Ste Marie atty (No Model.) 10 Sheets—Sheet 9.
M. S. LEVÈ.
MACHINE FOR MAKING AND FRAMING MATCH SPLINTS.
No. 587,130. Patented July 27, 1897.
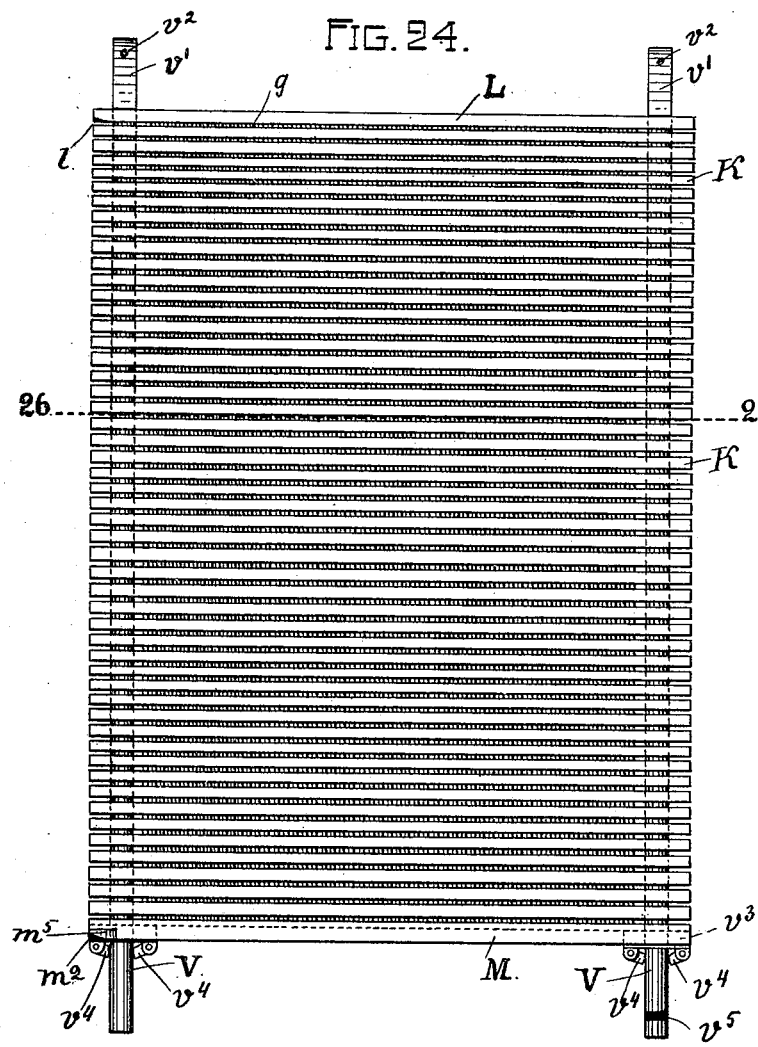
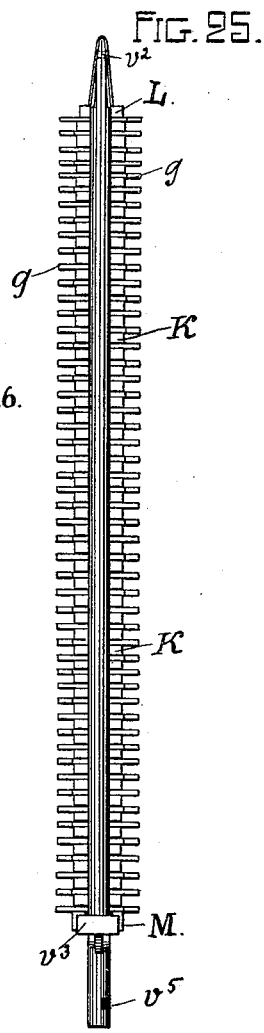
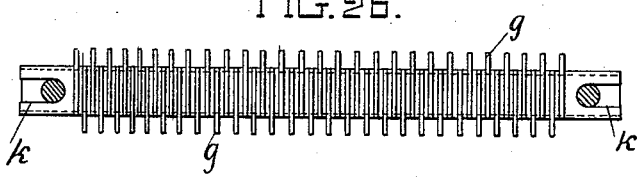
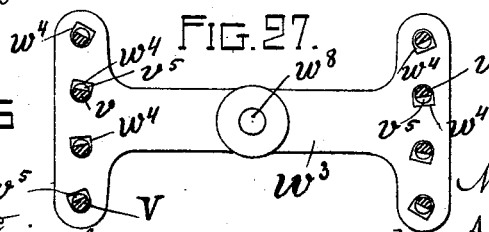
WITNESSES
D. Callaghan
Fabius T. Finch
INVENTOR
Marcus S. Levè
by A. H. Ste. Marie
atty (No Model.) 10 Sheets—Sheet 10.

M. S. LEVÈ.
MACHINE FOR MAKING AND FRAMING MATCH SPLINTS.

No. 587,130. Patented July 27, 1897.

WITNESSES
Daniel Callaghan
Fabius T. Finch

INVENTOR
Marcus S. Levè
by A. H. Ste Marie
atty

UNITED STATES PATENT OFFICE.

MARCUS S. LEVÉ, OF FRUITVALE, CALIFORNIA, ASSIGNOR TO THE AMERICAN MATCH COMPANY, OF SAN FRANCISCO, CALIFORNIA.

MACHINE FOR MAKING AND FRAMING MATCH-SPLINTS.

SPECIFICATION forming part of Letters Patent No. 587,130, dated July 27, 1897.

Application filed December 6, 1895. Serial No. 571,285. (No model.)

*To all whom it may concern:*

Be it known that I, MARCUS S. LEVÉ, a citizen of the United States, residing at Fruitvale, in the county of Alameda and State of California, have invented a new and useful Machine for Making and Framing Match-Splints, of which the following is a specification.

My invention has for its object to provide a simple, compact, and inexpensive machine adapted to cut up in a short time large quantities of splints suitable for the manufacture of matches and to frame the same as fast as they are cut in the best shape for dipping, thereby expediting the process of making matches and lowering the cost of production thereof.

With this end in view I have devised a machine which receives the wood or other splint material at several points at once in blocks of suitable thickness that are fed to it through a number of traveling chutes. These chutes are divided into several passages and distribute the blocks in groups upon a table provided with an endless series of scoring and slicing knives arranged in sets at regular intervals and respectively adapted to mark out and sever the splints in successive rows as the blocks in each group are brought around. The motion of the chutes carries the blocks against the knives and is utilized to gather the splints, the successive rows of which are caused to push each other into framing-chambers located behind and below each set of knives. A number of such rows are driven at a time upon layers of slats coming from another part of the machine. Like the splint-producing blocks these slats are fed to the machine through casings that are divided into suitable guideways corresponding in number with those of the divisions in the chutes and arranged to discharge also into the framing-chambers, so that a slat may be provided for every row of splints driven therein. The layers of slats and rows of splints are brought into the framing-chambers alternately through passages that run substantially at right angles one to the other, and they are gradually pressed down into separate compartments, said chambers forming columns composed of parallel piles, each adapted to make one or more frames of splint-bearing slats when these are clamped together. In being pressed down the piles in each column are spread apart to provide more room for the splints, which are spaced in two different ways, being separated sidewise one from another and every other splint in a row being carried lengthwise in a direction opposite to that of the neighboring ones in such a manner that alternate splints are made to project from the opposite sides of the frames. Clamping devices adapted to take in a suitable pile or part of a pile of splint-bearing slats and make a frame of the same are then introduced into each compartment of the framing-chambers from the outlet end thereof, and the clamped frames are drawn out in groups ready for the dipping operation.

Figure 2:
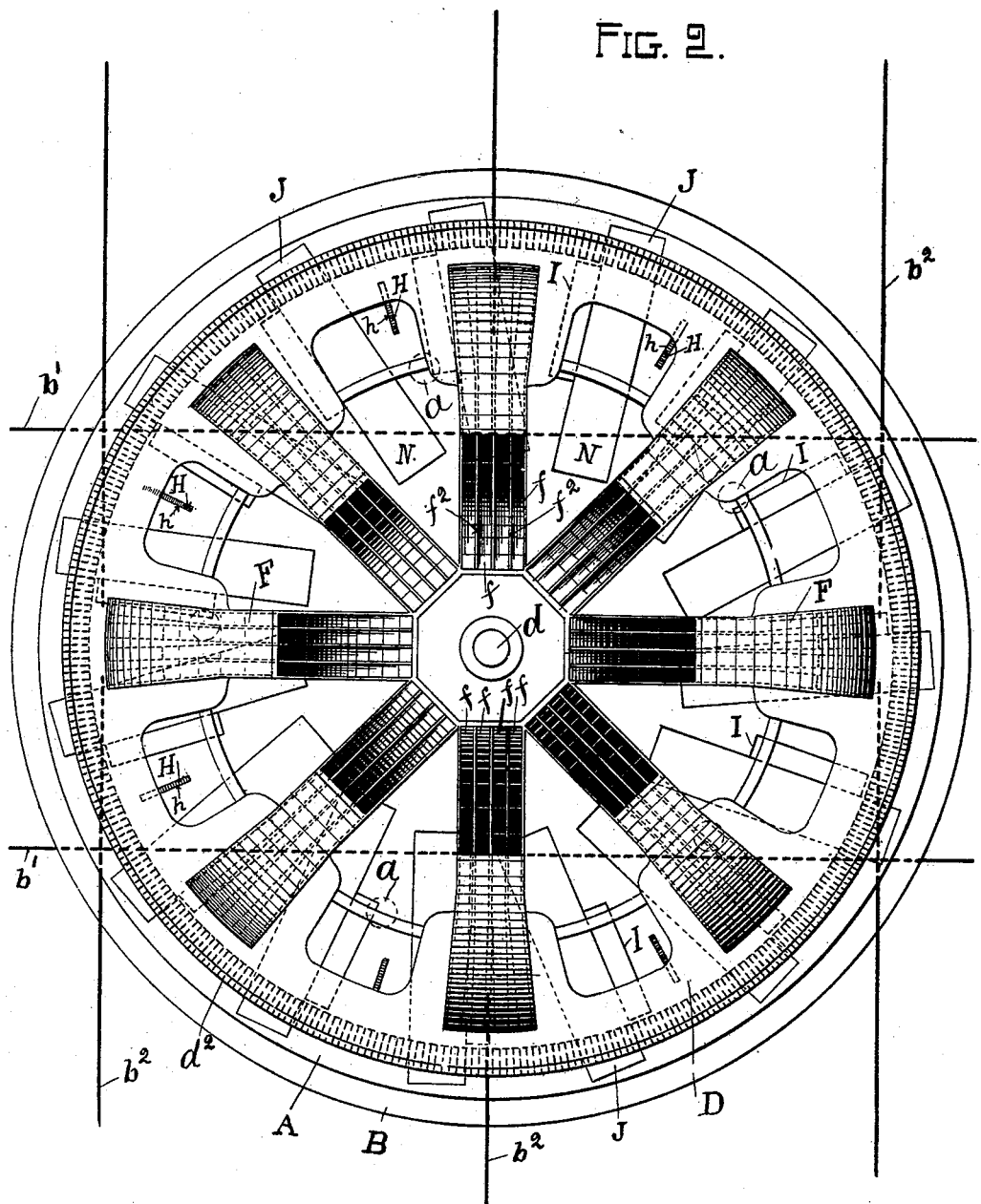
Figure 3:
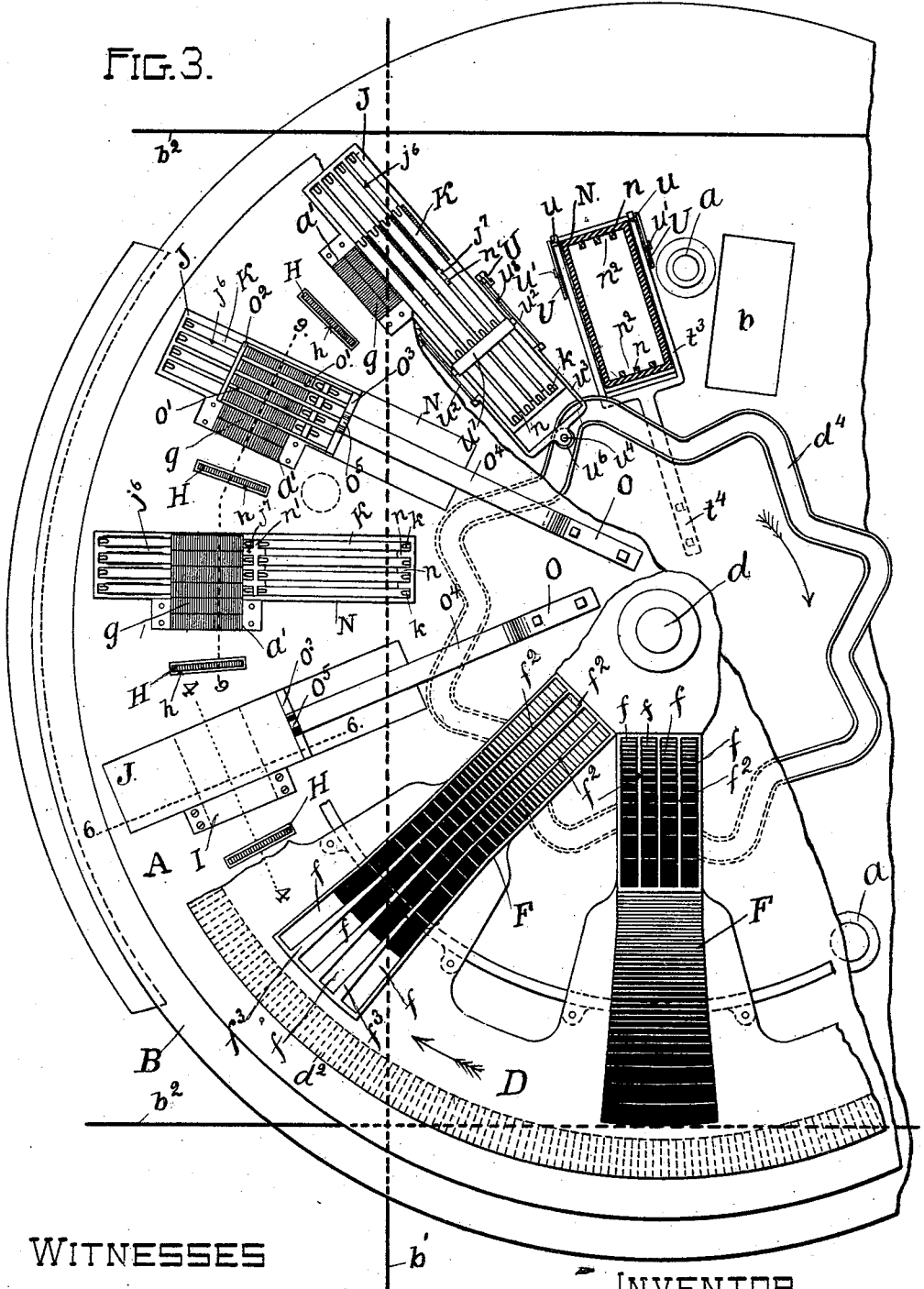
Figure 28:
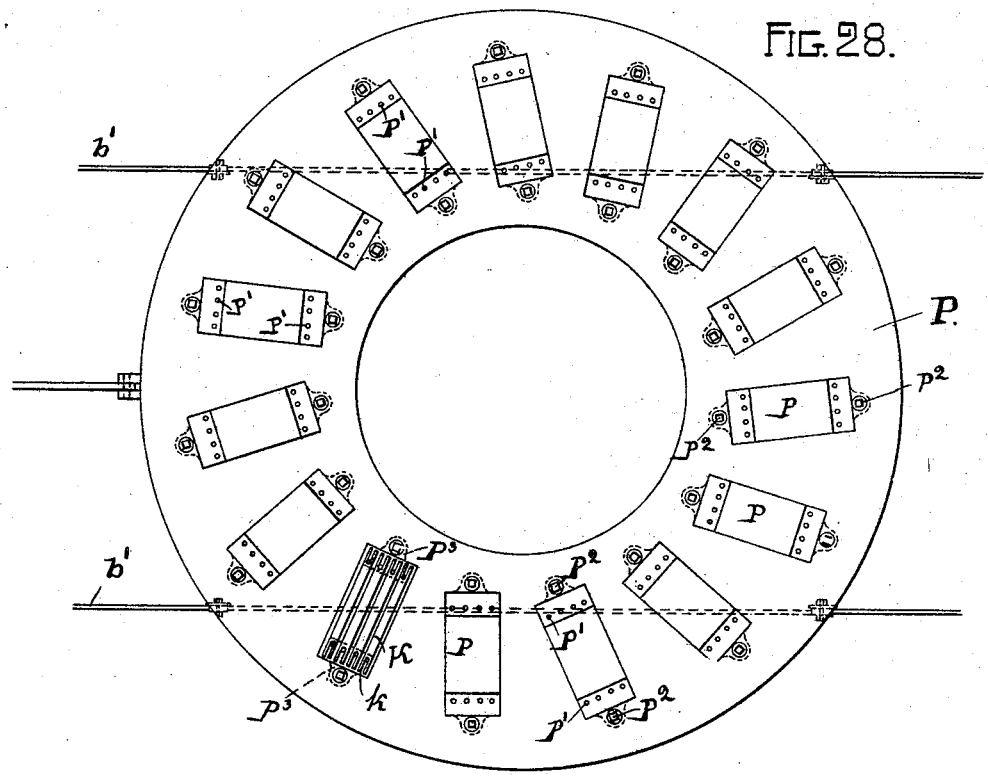
Figure 29:
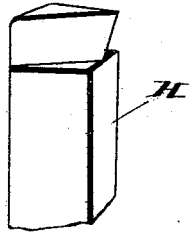

Referring now to the drawings hereunto annexed for a detailed description of my invention, Figure 1 is a vertical section through the center of the machine. Fig. 2 is a top view. Fig. 3 is a partial plan representing the construction on an enlarged scale, with the parts gradually broken away from the top down to show the inside mechanism at different levels. Fig. 4 is a broken vertical section on the line 4 4 of Fig. 3, showing one of the groups of blocks from which the splints are cut as being just past one of the slicing-knives. Fig. 5 is a similar view taken from the same line, but showing the blocks before they have reached the slicing-knife and while passing over the scoring-knives. Fig. 6 is a broken vertical section on the line 6 6 of the same Fig. 3. Fig. 7 is a top view of one of the depressors that are used for pushing down the splint-bearing slats into the framing-chambers. Fig. 8 is a cross-section on the line 8 8 of Fig. 7. Fig. 9 is a vertical section on the line 9 9, Fig. 3. Fig. 9$^A$ is a similar section showing how the framing-chambers can be set perpendicularly, instead of on an incline, with relation to the table that carries the splint-cutters. Fig. 10 is a sectional plan taken from the line 10 10 of Fig. 9. Fig. 11 is a like plan taken from the line 11 11 of said Fig. 9. Fig. 12 is a similar but enlarged view taken from the line 12 12 of Fig. 9$^A$, the splint-bearing slats being omitted. Fig. 12$^A$ is an enlarged sectional elevation of the slat-box and the framing-chamber represented on the left side of Fig. 1, part of the splint-bearing slats in said chamber being removed. Fig. 13 is a broken vertical section on the line 13 13 of Fig. 12ᴬ. Fig. 14 is a similar section on the line 14 14 of said Fig. 12ᴬ. Fig. 15 is a like view also taken from Fig. 12ᴬ on the line 15 15. Fig. 15ᴬ is a plan of the construction shown at the bottom of Figs. 12 and 15, looking downward. Fig. 16 is a perspective view of one of the slats composing the body of the frames into which the splints are gathered. Fig. 17 is a like view of the top slat of each frame. Fig. 18 is a similar view of the bottom slat of each frame. Fig. 19 is a broken plan showing the relative positions of certain slots provided in the ends of the three kinds of slats aforesaid as they appear when superimposed, the bottom slat being on top. Fig. 20 is a top view of semicircular carriages that are adapted to receive the splint-bearing slats from the framing-chambers and upon which are mounted the clamping devices used for binding said slats into separate frames. Fig. 21 is an enlarged cross-section on the line 21 21 of Fig. 20. Fig. 22 is a broken elevation of one of the rods forming part of said clamping devices. Fig. 23 is a sectional elevation showing the ends of two adjoining piles of splint-bearing slats before the clamping-rods are applied. Fig. 24 is a side elevation of a complete frame clamped and removed from the carriage upon which it was received. Fig. 25 is an edge view of the same. Fig. 26 is a sectional plan taken from the line 26 26 of Fig. 24. Fig. 27 is a top view of a plate that is provided for each set of clamping-rods to hold the same in the semicircular carriages. Fig. 28 is a top view of a carriage employed for filling the slat-boxes.

In the figures, A represents a table which is supported by legs or standards $a$ from a circular base B, resting upon the floor C of a suitable building. Upon this table is placed a wheel D, which is mounted so as to revolve in a horizontal plane at the upper end of an upright shaft $d$, passing through the center of said table and stepped in a box $d'$ on the base B. The wheel D is turned over the table A, with the shaft that carries it, by means of a conical pinion $e$, engaging a gear $d^2$, fastened to the wheel's rim on the under side, the said pinion being secured to the end of a driving-shaft E.

The wheel D carries a number of chutes F, that are set in suitable openings provided at regular intervals within its periphery and reach down close to the table. These chutes are perpendicular to the wheel at the bottom, but are curved inward at the top, converging toward a central point above the machine, where their inner ends meet, as shown in Fig. 2. They serve to bring upon the table the blocks of wood or other material G from which the match-splints are to be made and which may be cast into them from a stand or platform (not shown) erected close by. Said chutes are made large enough to be divided each into several passages $f$, preferably four in number, so that the blocks may move down in columns of fours or so at a time and be distributed in groups upon and around the table. The passages in each chute are made rectangular in cross-section in order to conform in shape with the wooden blocks, the width of each passage being a little over the length of an ordinary match. In the upper inclined portion of the chutes the passages are parallel, but in the vertical lower part they diverge slightly outward, the directions being changed in the bend $f'$, so that they will fall within a circle and radiate from the center of rotation. This change of direction is effected by increasing the thickness of the lower portion of the partitions $f^2$, separating the various passages, as at $f^3$, Fig. 3. The object of this peculiar construction and arrangement of parts is to produce a corresponding change in the relative position of the blocks while coming down the chutes, and thus have the lower block in each passage in line with a radius of the wheel or with its center in a plane passing through the axis of rotation. The various groups of blocks reaching the table through the openings in the wheel D are therefore set on similar curves and move in a circle about the table at a short distance apart one from the other as the chutes travel around with the wheel upon which they rest. These blocks bear on the upper surface of the table as they come out, and while following the circular path described by the chutes they are brought to the cutters to be split up and reduced to splints.

The splint-cutters consist of sets of scoring-knives H and slicing-knives I, placed at suitable intervals apart and arranged, as aforesaid, in an endless series about the edge of the table within the path followed by the blocks G, which they meet in succession. Each set of knives in the series comprises a number of scorers H, which are fixed vertically in the table in a row and upon a radial line. These scoring-knives are for the purpose of grooving the under surface of the blocks in parallel lines preparatory to cutting them into splints. It will be observed that as the blocks are traveling on a circular path the grooves cut into them will be curved and the splints correspondingly shaped. To offset this, the table A is made of large diameter and the lower end of the chutes F and the knives are placed as near as possible to the edge of it, so that the curvature of the grooves cut into the blocks will practically amount to nothing. The scorers are set far enough apart to leave a space between each groove equal to the width of a match. Their cutting edge $h$ is upwardly and forwardly inclined—that is to say, set on a line running in a vertical direction and with its upper point slightly forward—as represented in Figs. 4 and 5, and it is made to penetrate into the blocks the thickness of a match. Being inclined, as illustrated, the cutting edge of these knives has a tendency to hold down the blocks while cutting into them, instead of raising them, as would be the case were it made according to other previous constructions. Thus is avoided the necessity of feed-rollers and similar contrivances for maintaining the blocks in position while they are being acted upon by the cutters, the weight of the material piled up in the chutes in the present construction being sufficient to insure regularity of feed without any special feeding mechanism. Back of the scoring-knives are the slicers I, one of which is provided for each row of scorers. These slicing-knives are screwed to the table flatwise, as shown, and with their edge raised above it for a space equal to the thickness of a match. This edge is also set horizontally in such a way as to coincide with a line tangent to a circle described around the center of the table and the diameter of which is equal to the length of a match. The result of this particular arrangement is that the blocks carried by the chutes and previously grooved by the scorers are met aslant by the slicing-knives, which cut them with a shearing action, and the cutting at the finish, when the rear edge of the bottom openings of the chutes passes over the slicing-knives, is done on a perfectly straight line, the material so sheared off forming splints $g$, that are severed from the blocks all at the same time and kept together in straight rows.

While they are being cut, the splints are pushed under the slicing-knives by the very movement of the wheel D and chutes F thereon, containing the blocks G, at the same time being driven into inclined channels $a'$, formed in the table beneath the slicers I and leading into framing-chambers J. These channels are of a depth slightly exceeding the thickness of a match and just wide enough to receive the splints in rows as they are cut. The splints forced under the knives are therefore confined and guided in such a way that the rows cut from the blocks in each group will push each other through said channels. From the channels $a'$ the splints slide directly and in regular order into the framing-chambers J, across the upper surface of the framing-slats K L M, that are laid parallel therein, one row of splints pushing another until they are all safely lodged in—that is to say, as many as will reach across and fill the space above the layers of slats.

The framing-chambers above mentioned are rectangular casings located around the edge of the table underneath and fastened thereto below the channels $a'$, that form the entrance to each of them. They are open at the bottom and reach down toward the base B, leaving sufficient space above the latter to permit the introduction of a carriage for clamping and removing the splint-bearing slats, as hereinafter described. These chambers may be set vertical or on an incline in either of the ways represented at Figs. 9 and 9$^A$, as preferred, the construction illustrated at Fig. 9$^A$ being, however, favored.

The slats hereinbefore referred to come from supply-boxes N, located on the inside of the framing-chambers nearer the center of the machine and consisting of quadrangular casings seated over openings of similar shape in the base B, as at $b$, Figs. 1, 3, and 12$^A$, and running up to within a quarter of an inch or so of the table above. The slats are put into these supply-boxes in separate piles between vertical guides $n$, provided at both ends of said boxes. They reach the framing-chambers by passing over the outer wall of the boxes, as at $n'$, Figs. 1, 3, 12$^A$, and 14, falling thence into downwardly-running ways $j$, formed by guides $j'$, placed at the ends of said chambers, where they are kept separate, as in the supply-boxes and in position to receive the several rows of splints. They are supported in the framing-chambers from friction-slides $j^2$, placed in the ways $j$ and adapted to engage the ends of some of said slats as the same are moved down together with the splints with which they are loaded.

The rows of splints pushed over and across the layer of slats to be found at the top of each framing-chamber, as also the slats themselves, are pressed down as soon as they come into place, in order to make room for another layer of slats and its subsequent covering of splints, by means of depressors O. (See Figs. 3 to 12$^A$.) One such depressor is placed over the inner part of each framing-chamber far enough to reach beyond the top rows of splints therein and partly over the adjoining slat-box at the rear. Each one of these depressors is composed of parallel bars $o'$, fitting in suitable grooves $a^2$ in the under side of the table A and joined together at the ends by cross-bars $o^2$ $o^3$, one of which, the forward one, also fits in a groove $a^3$, while the other, the rear one, projects upwardly above the table through a slot $a^4$.

The several depressors are each attached to and held by a spring-arm $o^4$, projecting outwardly from the bar $o^3$ and secured to the upper surface of the table. Their tendency is therefore to rise and remain within the grooves in the table, as represented at Figs. 4 and 6, but they are periodically thrust down by a series of cams $d^3$, fixed to and disposed annularly on the under face of the wheel D. These bear consecutively as the wheels go round upon a knob $o^5$, formed on the rear bar $o^3$ of each depressor. A cam is provided for each chute on the wheel, and the several cams are set so as to work the depressors by turns directly after a chute has passed over a set of knives and the rows of splints cut from the blocks therein have found their way into the corresponding chamber below. The depressors subserve a threefold purpose. First, they are employed, as already stated, to push down the slats and splints laid at the top of the framing-chambers and make room for more slats and splints to come in, the cams $d^3$ forcing the depressors down a little more than the thickness of an ordinary slat each time they pass over; second, they bear down on the splints and hold them in position while another layer of slats is brought in, being provided with lugs $o^6$ on the under side, between which the splints are confined; third, they guide the incoming slats while crossing over from the supply-boxes into the framing-chambers. Figs. 1, 4, and 6 show the depressors in the right position to allow the splints to be driven across the slats in the framing-chambers—that is to say, in their raised position. Figs. 5 and 12$^A$ show them down as they appear after the splint-loaded slats have been depressed and while a fresh layer of slats is brought in from the supply-boxes between the parallel longitudinal bars $o'$, of which said depressors are composed. These bars are spaced in such a way that two of their number will bear on the two ends of each row of splints while the slats are driven thereon, the middle bars bearing upon the adjoining ends of adjacent rows, as shown. Fig. 9 illustrates the manner in which the cams are brought around to pass over the knob $o^5$ on the depressors' rear bar $o^3$.

The slats herein above spoken of as serving to frame the splints are preferably made of wood, except those that are to form the top and bottom of each frame and marked L M, which are better made of iron, in order that they may be possessed of sufficient strength to firmly bind the frames on the outside. All the slats are of the same length, but they vary in some other particulars. Fig. 16 shows in detail the form of the ordinary slats, which are marked K, being those which go to make the main body of each frame. These are plain bars of uniform width, thickness, and length and are provided at both ends with plain slots $k$ of equal dimensions. They are also chamfered on the right side, as at $k'$, in order that the rows of splints may not strike their edge, but may readily slide over them when entering the framing-chambers. (See Figs. 4 and 9.)

The top slat L, which is represented at Fig. 17, is rectangular in cross-section, is somewhat narrower and thicker than the ordinary slat, and is rounded up at one end, as at $l$. It has slots $l'$ at both ends like the ordinary slat, except these slots are narrowed at $l^2$. The bottom slat M, which is to be seen in detail at Fig. 18, is made of channel-iron and is of substantially the same width as the ordinary slats, but of double the thickness of the latter at the edges, thus having in its center a channel or groove $m$ of sufficient size to receive the top slat L, which is made to fit in it, as will be observed by reference to Figs. 9, 14, and 23. Like the ordinary slats the slat M is chamfered on the right side at $m'$, and it is rounded at $m^2$ like the slat L. It is also slotted at both ends like the others, but its slots $m^3$ are cut out the reverse of those provided in the slat L, being narrower at $m^4$ or at the extremities instead of at the inner part. It is furthermore reduced in width or pointed at the rounded end somewhat in the shape of a wedge, as at $m^5$. The three kinds of slats are put into the supply-boxes in suitable piles, according to the size of frames which it is desired to make, and are arranged to follow up one another closely, the top slat L for each frame being placed within the channeled part of a slat M, adapted to form the bottom of another frame, as shown.

Fig. 19 indicates in plan the position of the three forms of slats in the piles and how their slotted ends are laid out with relation to each other, the slat M appearing at the top in said figure, the slat L next under it, and the ordinary slat K below both.

The slats are placed in the various supply-boxes, as aforesaid, in piles, comprising a sufficient number each to form a frame of convenient size, with the splints to be deposited thereon in the framing-chambers. Four such piles are put into the boxes at one time, or one into each division $n^3$, formed by the guides $n$, and all the boxes are attended to at one and the same time. The piles of slats are therefore placed in groups and are brought to the supply-boxes on a circular carriage P, adapted to be run on a suitable track $b'$ into the base B, the sides of which are open or cut away for the purpose, Figs. 1, 3, and 28. Each group of piles is placed on a centrally-raised plate or platform $p$, and is held in position thereon by vertical rods $p'$, passing through their slotted ends. The carriage has a number of such platforms proportionate to that of the supply-boxes to be filled. These platforms are fitted in suitable openings in the carriage from the under side and are yieldingly secured thereto by means of spring-supported rods $p^2$, screwed into lugs $p^3$, formed at the ends of each platform and extending under the carriage. The rods $p^2$ pass through suitable holes in the carriage, as shown, and are provided at their upper end with nuts $p^4$, that bear upon spiral springs $p^5$, confined between them and the upper side of the carriage. The platforms P and vertical rods $p'$, carried thereby, are so located that the various groups of slat piles when brought by the carriage into the base of the machine will stand right under the open lower end of the supply-boxes and in position to enter the several divisions or guideways $n^2$ therein. The slat piles are made to enter the said divisions and introduced into the boxes N by hoisting them on the carriage, which is effected by means of an elevator located below and arranged to work within the base of the machine.

The elevator aforesaid consists of a round platform Q, set in the floor C and adapted to be raised up to the under side of the carriage and lift the same by the center toward the supply-boxes. This platform is normally seated in rabbets $c$, within an opening cut in the floor C, and is otherwise supported by timbers, such as $c'$. It is raised by means of vertical racks $q$, (three or more in number,) that are moved by pinions $q'$, set upon one end of small shafts $q^2$, the other end of which carries conical pinions $q^3$, meshing with a bevel gear-wheel $q^4$, loosely mounted upon a rotary vertical shaft R, which is journaled in a bearing $r$, attached to the timbers $c'$ and stepped in a box $r'$. The shaft R is continuously rotated by a bevel gear-wheel $r^2$ and pinion $s$, driven by a horizontal shaft S from a suitable motor. (Not shown.) The gear-wheel $q^4$ is held up on the upright shaft R by a collar $q^5$, keyed to said shaft, and it is worked, in order to actuate the shafts $q^2$, with their pinions and the connected racks $q$, by means of a clutch $q^6$, adapted to be coupled with it and feathered in the usual manner on the shaft R. The clutch $q^6$ being coupled with the gear-wheel $q^4$, the elevator is set in motion and raised, thereby hoisting the carriage with the plates $p$ and slat piles thereon and lifting the said slat piles bodily into the supply-boxes.

The slats are taken up from the raised carriage and slipped off the vertical rods $p'$ by notched bars T T′, that are arranged to work together on opposite sides of the supply-boxes in each division thereof. These bars project downward through the lower end of the boxes N into the openings $b$ in the base of the machine and reach up within the several supply-boxes a distance about fifteen inches from the top in each guideway. The two bars T T′ are placed one by the side of the other, as shown at Figs. 1 and 12$^A$, the inner ones in opposite guideways being fastened to the end walls of the boxes N and the outer ones to the ends of a quadrangular collar $t'$, which is held up by links $t^2$, passing through suitable holes in the base of the machine and connected with a forked flat spring $t^3$. (See also Figs. 3, 15, and 15$^A$.) One such collar and one such spring are provided for each supply-box, the collars being placed directly below the boxes N within the base B and the springs above said base with their branches straddling and extending along the sides of said boxes. The stem of each spring is secured to the upper side of the base B, as at $t^4$. The inner bars T, it will be observed, are stationary, whereas the outer ones, T′, are movable with the collars $t'$ and their spring connections, to which are imparted an oscillatory movement in a vertical plane by means of pins $u$, set in the short arms of levers U and adapted to bear upon the free ends of the springs $t^3$. The levers U are fulcrumed at $u'$ by the sides of the supply-boxes and are swung back and forth by links $u^2$, connecting them with shackles $u^3$, reciprocated by a grooved cam $d^4$, which is rigidly secured to the central upright shaft $d$ and revolves therewith.

There are two levers U, with corresponding links $u^2$ and one shackle $u^3$ for each supply-box, and each shackle is provided with a transverse pin $u^4$, having end rollers $u^5 u^6$, the upper one of which moves back and forth within a guide-box $n^5$, projecting rearwardly from each supply-box, while the lower one follows the groove of the cam $d^4$. The latter has a wavy outline, as shown at Fig. 3, being adapted to work the rollers $u^5 u^6$ and pins $u^4$ in a straight line and shaped so as to impart motion to the levers U, through the shackles $u^3$ and links $u^2$, by moving them at a similar rate of speed both ways whatever may be the position of the supply-boxes. Upon the grooved cam being revolved with the shaft $d$ in the direction of the arrow in said Fig. 3 the rollers $u^6$ are alternately forced up and down the curves of which the cam is composed, and the shackles to which they are attached and the parts thereto connected are worked accordingly. The stationary bars T and the movable bars T′ are of similar construction, both being made of springy metal and slitted for nearly their entire length, as at $t^5$, in order that they may yield to side pressure to some extent. Rubber cushions $t^6$ may be inserted at certain intervals in the slits $t^5$, as represented in Fig. 15, if desired, so as to increase the resiliency of these bars in case it is found that they are not stiff enough when their sides are pressed together. Both sets of bars T T′ are notched on two opposite sides in a similar manner, the notches $t^7 t^8$ in the sides of each bar being cut all in one direction from the edge downward and forming on each bar two series of oppositely-laid steps $t^9 t^{10}$, that rise in a vertical direction. The bars T T′ are made of such width that they readily go through the slotted ends of the slats as the latter are lifted on the carriage, the said bars entering the slots of the various slats near the extremities thereof, as at $t^{11}$, Fig. 19. The slots $k$ $l'$ being wide at this point offer no obstacles to the passage of the notched bars, and as to the slots $m^4$ they are simply narrow enough at the same place to compress the sides of the notched bars slightly and permit the slats to be slipped past the notches $t^7 t^8$ upwardly. Once raised the piles of slats cannot fall back, owing to the resilience of the notched bars, the sides of which spread apart after each compression far enough for any of the pairs of steps $t^9 t^{10}$ to slide under the bottom slat of each pile, at the narrow slotted part thereof, and thus hold it up and all the other slats above it. The groups of slat piles having been taken up from the carriage P into the supply-boxes and the outer notched bars T′ therein being reciprocated by the collars $t'$ and springs $t^3$ thereto connected, as the latter are alternately pressed down and released by the pins U the said outer bars carry up the slats at each return stroke on their steps $t^{10}$ a distance proportionate to the play allowed them within stationary bars T the full limit, if the way be clear above, or otherwise as far up as said movable bars can reach if their movements be impeded by previously-inserted slats—for instance, when the slats reach up to the top of the supply-boxes and are ejected therefrom into the framing-chambers but one layer at a time, consequently limiting the action of the notched bars below. As they are moved up at each upstroke of the movable bars the slats are forced past so many notches $t^7$ of the stationary bars and then allowed to rest on the steps $t^9$ of the latter, while the movable bars are slipped back through the slots $k$ $l'$ $m^4$ and brought down by the collars $t'$ and the oscillatory springs $t^3$. The piles of slats thus go up step by step or so many steps at a time, as the case may be, intermittingly resting on the stationary bars while the movable bars go back to take a fresh hold. Piles after piles are put into the supply-boxes in the same way until the latter are full, the slats moving up in a column in each division of the boxes N. Should the carriage P with the slats thereon be raised higher than the columns of slats already lodged in the supply-boxes will allow, no damage will be occasioned thereby, as the spiral springs will yield and the plates or platforms $p$ and the lower part of the slat piles supported thereby will be held down below the carriage until more room is afforded above, when the loaded platforms will rise by degrees till the slats are all in, after which the carriage can be lowered and sent back for another load. If, on the other hand, the carriage be late in coming, there will be an intervening space between the slat piles last inserted and the new ones brought in on the carriage; but this will be only temporary, as, owing to the peculiar construction and arrangement of the notched bars, which extend but partly up the guideways, as before described, the slats newly brought in will move faster than the previously-inserted ones as soon as the latter have passed the upper end of the said bars. The movable bars T' being then allowed their full play, no matter if the boxes N are filled or not above, the lower slats are afforded the opportunity to overtake the upper ones and quickly fill up the gap between them.

The feeding of the slats into the framing-chambers is effected by means of cross-bars $u^7$, one of which is provided for each supply-box. These cross-bars are connected, by means of links $u^8$, with the upper end of the levers U, hereinbefore mentioned, which are extended up for the purpose and are oscillated in vertical planes by the sides of the supply-boxes, as previously explained, through the agency of the grooved cam and the intermediate connections. As the levers U are moved to and fro the cross-bars $u^7$ are made to slide back and forth across the upper end of the supply-boxes and throw off the upper layer of slats in each box into the adjacent framing-chamber—that is to say, the upper slats from the slat piles that have reached the top of any of the supply-boxes. These slats, as already stated, pass over the outer wall of the supply-boxes at $n'$ and are guided into the framing-chambers by the parallel longitudinal bars $o'$ of the depressers O, which are respectively timed in their movements so as to be then in their downward position under the cams $d^3$. Upon entering the framing-chambers the layers of slats are received between the guides $j'$, which are preferably made to extend from the top to the bottom of each chamber at both ends, Figs. 3 and 12$^A$, and project enough inward to confine the ends of each slat and keep it separate from the others in the same layer, the slats reaching from one end wall to the other with but a slight clearance sufficient to allow them to descend in the ways $j$ without friction.

The ways $j$, it will be observed, are arranged to correspond with the guideways or divisions $n^2$ of the supply-boxes, so that the slats can readily pass from one to the other and fall into the framing-chambers in precisely the same order as they are ejected from the supply-boxes. The slats go down freely in the ways $j$ till they have reached the friction-slides $j^2$, hereinbefore described, which engage their slotted ends and operate to stop their descent, Fig. 9, 9$^A$, and 13, up to such time as force is applied from above to drive them down through the agency of the depressers O. A certain number of slats are allowed to be thrown in this way from the supply-boxes and piled up in separate columns in the framing-chambers until the space above the slides $j^2$ is filled before any splints are cut and deposited unto them. When this space is filled, the upper slats are prepared to receive across their face a row of splints which come in, as they are severed from the blocks G, through the channels $a'$, forming the entrance to each framing-chamber. The depressors are arranged to spring back in the meanwhile by having the cams $d^3$ out of the way past the knob $e^5$ on their rear bar $o^3$, and the cross-bars $u^7$ are retracted by the levers U in position to bring in another layer of slats, the oscillation of the various pairs of levers U being timed to throw a layer of slats into the framing-chambers for and alternately with every row of splints. Only one slat from each column in each division of the supply-boxes is fed to the framing-chambers at one time, except the top and bottom slats L M, that are provided for each splint-frame and which are thrown together, the one which is to be at the top of the frame fitting within the channeled part of that which is to be at the bottom, as shown, and the cross-bars $u^7$ being sufficiently thick to strike the ends of both such top and bottom slats of each pile. The space between the upper edge of the outer wall of the supply-boxes and the table above is accordingly made large enough to let out these two slats L M together. To prevent the passage also in the same manner of two of the ordinary or middle slats K, obstructions are placed within the space $n'$, which obstructions consist of flat springs $n^3$, attached to the outer wall of the supply-boxes on the inner face thereof and in the corners formed by the vertical guides $n$ in the divisions $n^2$, Figs. 1, 12$^A$, and 14. These springs are placed in recesses $n^4$, specially provided for them, and project into the lower part of the passage $n'$, into which the guideways open, standing but at a short distance from the table A and leaving between it and their upper end a free space only a little over the thickness of one slat. Thus located they will prevent any two slats K of the ordinary make from passing through said passage together, the slat lying at the very top only having sufficient room to pass over the spring $n^3$ adjacent to it when pushed by the crossbar $u^7$ and the slat next under being caught by its square corners by said spring $n^3$ and held back until it is in turn raised to the top through the agency of the notched bars. The two slats L M, on the other hand, readily pass out together, as the recesses $n^4$ are made flaring upwardly, so that the springs $n^3$ may be pushed aside at the top, and while the rounded ends $l\ m^2$ of said slats enter the upper unobstructed part of the passage $n'$ without difficulty the wedge part $m^5$ of the channeled slats M enables them to force their way between and past said springs and thence slide over into the framing-chambers.

The framing-chambers above described are preferably made narrow in the upper part, as indicated at Figs. 9 and 9$^A$, where the layers of slats and rows of splints are brought together, being just wide enough at the place named to receive four rows of splints or so, placed end to end, and the slats thereunder, in the position illustrated at Fig. 3. One of their side walls $j^3$ is, however, made flaring somewhat outward at $j^4$, at the point where the splints first enter, in order to provide an additional space of about half an inch, with a suitable incline for the splints to drop in lest some of their number should be severed from the blocks G before time, and the last row to enter a chamber should not be pushed in far enough to get entirely into it if the side wall over which it passes were made vertical. Barring this incline the side walls $j^3$ are straight for some distance down, and the slats and splints are kept compactly between them, so that the row of splints may be evened up preparatory to forming the frames.

As already stated, each layer of slats entering the framing-chambers is pushed down as soon as it has received its covering of splints by means of the depressors O and the cams $d^3$, placed under the wheel D, the splint-loaded slats being piled in the ways $j$, as shown, and held up within the same by the friction-slides $j^2$, which engage the narrow slotted part of the bottom slat M of each pile, Fig. 13. These friction-slides are attached, one opposite another, to the end walls of the framing-chambers on the inside at a suitable height within the ways $j$, as aforesaid. They are composed of spring-bars either slotted or doubled up to form two downwardly-extending branches having sufficient tension to hold up the piles of splint-bearing slats and allow the same to come down only when acted upon by the depressors. Rubber cushions $j^5$ are inserted between these branches of the slides $j^2$ at several points to impart to them a uniform tension. The several columns of splint-bearing slats supported by the friction-slides, it will be seen, descend by degrees as the depressors are swung up and down. While they are thus pressed down, the slats and splints are kept close together by the lugs $o^6$ of the depressors, as already stated, and also by the side walls $j^3$ of the framing-chambers and the guides $j'$ therein, which are projected inwardly from opposite sides, as at $j^6\ j^7$, for this purpose. They are thus kept in a compact body for a certain distance down, say as far as the line $a\ a$, Figs. 9, 9$^A$, and 12$^A$. Below this point the framing-chambers widen gradually for another short distance downward, or until the line $b\ b$ is reached and the ways therein become divergent, as illustrated in said Fig. 9, so that the splint-bearing slats are for the same distance gradually carried apart, thereby separating the splints endwise. From the line $b\ b$ the side walls of the framing-chambers and the ways therein run down on substantially straight lines. At a point slightly above the line $b\ b$ the guides $j'$ are joined to one another from opposite sides by partitions $j^8$, which run the full length of the framing-chambers and subdivide the same into so many different compartments for the splint-covered slats to slide down in, as represented in Figs. 9, 10, and 11. The spacing devices for the splints are located in these compartments. The number of such compartments corresponds with the number of piles of superimposed slats and splints, as the same are distributed from the adjoining supply-boxes and from the chutes and knives above. The partitions aforesaid are all made with a thin edge $j^9$ at the top, so as to readily enter between the parted ends of the rows of splints carried by the slats. Each one of the compartments formed by the partitions $j^9$ and the side walls $j^3$ of the framing-chambers is provided on both sides with upwardly-running ribs $j^{10}$, forming grooves $j^{11}$ between themselves of a width slightly over the thickness of a splint. These ribs and grooves constitute the spacing devices hereinbefore referred to. They are made and arranged in such a way as to act as wedges or inclined planes upon the splints borne by the slats. As shown, the said ribs and grooves commence at a point slightly below the edge of the partitions, from which point they run in vertical parallel planes for a short distance downward or as far as the line $c\ c$, Fig. 12$^A$. From this line down they diverge and are inclined more or less, according as they are nearer to or farther away from the ends of the framing-chambers, until they are spread over nearly the full width of the partitions and of the side walls $j^3$, or as far as the line $e$ $e$, below which they again run straight downward in parallel vertical planes to the lower end of the framing-chambers. The upper part $j^{12}$ of the ribs $j^{10}$ is furthermore beveled or inclined upwardly from the line $d$ $d$ to their upper end, as shown at Figs. 9 and 9$^A$. The grooves $j^{11}$, together with the ribs $j^{10}$ forming the same, are arranged to alternate on opposite sides of the partitions and on the side walls of the framing-chambers, so that a rib will be facing a groove always, as illustrated at Fig. 11. The splints, it will be understood, are acted upon by the ribs and grooves as soon as they fall within the various compartments of the framing-chambers past the upper edge of the partitions. They are first shifted endwise, one splint being pushed one way by the upper inclined part $j^{12}$ of one of the ribs $j^{10}$ into one of the grooves $j^{11}$ and the next splint the opposite way by a similarly-shaped rib into a similar groove, and so on alternately for all the splints in a row. While they are thus shifted, the splints are at first kept moving down in a straight course by having, as aforesaid, the upper part of the ribs, and consequently the grooves therebetween, laid out in parallel vertical planes. This is done so as to insure the proper working of the spacing devices and provide for the ready insertion of the ribs between alternate splints, the ends of which they meet in a direct line and alternately from opposite sides. After the upper inclined end $j^{12}$ of the ribs has been worked in the splints begin to be shifted laterally while the shifting endwise is being completed. At the line $d$ $d$ the end shifting is complete. From the line $d$ $d$ down to the line $e$ $e$ the splints are carried still farther laterally until they are spread out nearly over the whole surface of the slats, between the end slots thereof, as represented at Figs. 10 and 26. At the line $e$ $e$ the shifting of the splints sidewise, as well as endwise, is finished, and from that line downward the splints descend with their position unaltered. The splints are then wide enough apart to be dipped into the ignitible composition that will turn them into matches, and a certain number of slats with the splints on them spaced in the manner described are therefore allowed to gather in the lower part of the framing-chambers, where they are guided and held by the spacing devices while being formed into frames and while such frames are clamped together. The ribs $j^{10}$, it will be observed, are located in each compartment of the framing-chambers, within the space comprised between the guides $j'$ and the projections $j^6 j^7$ thereof, the said guides and projections being made to coact with the spacing devices and running, as indicated in Figs. 3 and 12$^A$, from the bottom to the upper end of the framing-chambers, where they stand close enough to each other to embrace and conduct the splints for some distance down in close rows in the order that the same are cut and driven into said framing-chambers and forced down therein by the depressors, as before explained.

The framing of the splint-covered slats is effected by means of rods V and certain other clamping devices hereinafter described. (See Figs. 20 to 27.) The rods V are made to be inserted through the slotted end of the slats K L M at the point marked $v$ in Figs. 10 and 19 and are of sufficient length to pass through any of the slat-piles hereinabove described after the same have been loaded with splints, such a pile comprising, as represented in Figs. 1 and 9, the bottom slat M, the splints $g$ and slats K above it, and the top slat L, located within the channeled part of the bottom slat M of the adjoining pile, formed farther up the framing-chamber J. The upper end of said rods V is wedge-shaped, as shown, and is capped by a flat spring forming barbs $v'$, bent down over its sides and suitably fastened to it by a rivet $v^2$, Fig. 22. The ends of such spring are left free and lie close enough to the rod to which said spring belongs to pass either way without hindrance through the slots $m^3$, provided in the slats M, as well as through the slots $k$ of the slats K, and by a slight compression also through the narrow part $l^2$ of the slots to be found in the slats L. Each rod V and the spring $v'$ thereon is therefore adapted to slip readily up or down through the bottom and middle slats of each pile, but if pushed through the top slat thereof cannot be retracted without the spring being pressed back, since the ends of the spring will naturally spread apart after their passage through said top slat and will abut and bear against it on each side of the narrow slot $l^2$, though the rod, if long enough, can be pushed farther up beyond that point through part of another slat-pile, in which case it can be pulled back subsequently until the ends of the spring are caught on the edges of the narrow slot $l^2$ in the slat L, as aforesaid, Figs. 23 and 25. The rods V carry, besides, at their lower end each a small square block $v^3$, held thereon by spring-pressed pawls $v^4$, which are hinged to the under side of each block in such a manner as to allow the rod that carries it to slip through it downward, but not in the opposite direction. All the rods thus provided with springs and blocks are set upon semicircular carriages W W, by means of which they can be brought under the framing-chambers in position to enter the various compartments thereof. These carriages are adapted to travel on rails $b^2$ and may be moved from any suitable platform or floor (not shown) unto the base of the machine. (See Figs. 1 and 20.) The construction of such carriages is shown in plan and section at Figs. 20 and 21. They consist, as will be seen, of plates made in the shape of half-rings and mounted on wheels $w$, the same forming a full ring adapted to surround all the slat-supply boxes when brought together under the framing-chambers from opposite sides of the machine. The semicircular carriages aforesaid carry the rods V on both their inner and outer edges, said rods being distributed thereon in equal rows, facing one another and placed at regular intervals apart. There are four rods in each row or such a number as will correspond with that of the compartments in the framing-chambers, the object in view being to provide two rods for each frame of splint-bearing slats to be formed therein, one at each side, and to have them in such a position when the carriages are raised that they may be pushed straight through the slotted ends of said slats as the same are piled up in the divers compartments. Two rows comprising four rods each and placed opposite each other are therefore provided in the present case for each framing-chamber. The rods in the different rows are inserted into holes $w'$, made in the sides of the carriages W and over which are seated the blocks $v^3$, carried on the lower part of said rods. These holes are made flaring upwardly to provide for the downward play of the spring-pressed pawls therein, and thus allow the rods V to be slipped through said blocks when required. From the holes $w'$ the rods V are passed through sockets or hubs $w^2$, formed on the under sides of the carriages W, and thence they are driven down through plates $w^3$, having D-shaped openings $w^4$ and located directly underneath, Figs. 20, 21, and 27. One of these plates is provided for each two rows of oppositely-placed rods. The said plates are held up to the carriages W by screws $w^5$, running through and adapted to turn in boxes $w^6$, that are formed in each carriage on a line midway between the edges thereof, each screw being provided with a flat head $w^7$, that bears on the upper surface of the carriage through which it runs. There is but one screw for each plate, the plate in each case having a central hole $w^8$, provided with an internal screw-thread engaged by the lower part of the screw that holds it.

The different rows of rods V are supported and held in place by the plates $w^3$, which are made to engage notches $v^5$, cut into one side of each one of said rods at the lower end, where the same passes through the D-shaped openings. This is accomplished by turning the plates $w^3$ slightly to one side on their supporting-screws, so as to bring the straight part of the D-shaped openings within the side notch in each rod, when the divers rows of such rods become locked in place and are kept in the right position for entering the different compartments of the framing-chambers. The rods V are introduced into said compartments by raising the semicircular carriages upon which they are mounted after the same have been brought under the framing-chambers over the base of the machine. Like the carriage P, previously described, the semicircular carriages W are elevated by means of vertically-movable racks X, passing through the base of the machine and the floor C below and engaged by pinions $x$, provided on the outer end of shafts $x'$, the inner end of each of which has a conical pinion $x^2$, meshing with a bevel gear-wheel $x^3$, loosely mounted on the rotary shaft R, hereinbefore mentioned. The wheel $x^3$ is held on the shaft by a suitable collar $x^4$, and it is set in motion by means of a clutch $x^5$. The carriages W being raised, the rods V go up through the slotted ends of the various splint-bearing slats in the manner aforesaid, first passing through the lower slats M, next through the body of ordinary slats K, then, with their springs $v'$ compressed, up through the upper slats L and as far above the latter into other slats as their length will allow or until the carriages have been fully elevated, when the blocks $v^3$, seated thereon, will enter and become lodged in the channel $m$ of the lower slats, the slotted ends of which were first entered by the rods V. The segregation, tightening, and clamping of the splint-bearing slats that are to compose different frames can then be effected by partly pulling the rods V down through the carriages upon which they are mounted. This result is brought about by turning the screws $w^5$ so as to force away from the carriages W the plates $w^3$, with which the lower end of said rods is engaged. To this end the screws $w^5$ are provided with sprocket-wheels Y, that are placed between the boxes $w^6$, provided for said screws in the center of the carriages W and the central perforated part of the plates $w^3$. Over and around these sprocket-wheels, under each semicircular carriage, is passed a sprocket-chain $y$, the inner end of which is arranged to bear against a line of idler-rollers $y'$. This chain is moved by a main sprocket-wheel $y^2$, adapted to be turned by means of bevel-gearing $y^3$ and a rotary handle $y^4$, as shown in Fig. 20, a like mechanism being provided for each one of the semicircular carriages, though represented only in connection with one. The handle $y^4$, being turned a few times, operates to move all the sprocket-wheels and screws connected therewith in one direction and causes the plates $w^3$ to ascend or descend, according to the way in which said handle is turned. If it be turned to lower the plates, the latter will be made to firmly engage the notched end of the rods V and to pull these rods downward. Turning it the opposite way will of course have a contrary effect. Upon being forced down, the plates $w^3$ partly withdraw the rods V from the compartments of the framing-chambers and cause their upper end to slip back through any slats into which it may have been inserted above the top slat of any one pile, or until the springs $v'$ encounter and rest upon the upper margin of the narrow slot in said top slat, the lower end of the rods in the meanwhile slipping through the blocks $v^3$ under the bottom slat. The further turning of the handle $y^4$ in the same direction tightens the piles of splint-bearing slats through which the rods V have been passed, and presses their component parts together till they are in compact form and firmly caught between the springs $v'$ at the top and the pawl-supported blocks $v^3$ at the bottom. The frames are then clamped and complete. In the meanwhile the carriages W may be lowered and the frames formed thereon taken out of the framing-chambers, when it will be seen that the said frames stand in groups where the rods V previously stood alone on the carriages. The rotary handles $y^4$ being now turned in a reverse direction to raise the plates $w^3$, the lower end of the rods V will be released easily, and the frames can be taken off their respective carriage without difficulty, with the splints therein suitably spaced and adapted to be dipped into the ignitible composition from opposite sides, the same being bound by the rods V, the springs $v'$, and the blocks $v^3$, carrying the spring-pressed pawls $v^4$, as represented at Figs. 24 and 25.

Having now described my invention, what I claim, and desire to secure by Letters Patent of the United States, is—

1. In a machine of the character described, a splint-material-carrying chute set upon a wheel with its bottom opening on a radial line, in combination with a table located in a plane parallel with said wheel, a row of scoring-knives arranged also on a radiating line on said table, and a slicing-knife back of said scoring-knives, the said slicing-knife being set so as to coincide with the back end of said chute as it passes said slicing-knife, whereby the severing of all the splints in a row is completed simultaneously along the whole line, substantially as set forth.

2. In a machine of the character described, the combination of a stationary cutting apparatus, a suitably-apertured table upon which the same is mounted, mechanism for carrying the wooden blocks in succession against the cutting apparatus over the table, an automatic framing mechanism beneath the table and in operative relation to the cutting apparatus and passage for the splints, and means for supplying slats to said framing mechanism, the whole being constructed and arranged so that the splints may be cut in successive rows and caused to push one another over the slats in the framing mechanism alternately with the slats, substantially as set forth.

3. In a machine of the character described, the combination of a table, a slat-box and a framing mechanism located entirely under said table, means for transferring slats from said box to said framing mechanism, and a fixed cutter on the table discharging splints into the framing mechanism alternately with the slats, substantially as set forth.

4. In a machine of the character described, the combination of a cutting apparatus, means for carrying splint material thereto, framing mechanism adapted to receive the cut material from said cutting apparatus, a slat-holder, and means for taking loose slats from said holder and feeding the same over the cut material in the framing mechanism, substantially as set forth.

5. In a machine of the character described, the combination of a table, a series of framing devices and a series of adjoining slat-boxes both located entirely under the table, splint-cutters arranged upon said table and adapted to discharge through the same into said framing devices alternately with said boxes and mechanism for bringing splint material successively to said cutters, substantially as set forth.

6. In a machine of the character described, the combination of a slat-box provided with guides forming suitable divisions therein, a framing-chamber also provided with guides forming ways corresponding with said divisions, and mechanism for guiding and driving slats from the divisions of said box into the corresponding ways of said chamber, substantially as set forth.

7. In a machine of the character described, the combination of a cutting apparatus, a wheel carrying the splint material to said apparatus, a framing device adapted to receive the cut material therefrom, a slat-box, mechanism operated from said wheel whereby slats are passed through said box, and means for transferring said slats to said framing device alternately with the cut material lodged therein, substantially as set forth.

8. In a machine of the character described, the combination of a series of slat-boxes, a series of framing devices communicating therewith, a series of splint-cutters, a wheel carrying the splint material successively to said cutters and driving the material cut thereby into said framing devices, a shaft rotated by said wheel, and intermediate mechanism whereby the slats are ejected from said boxes into said framing devices in time to receive the cut material from the cutters, substantially as set forth.

9. In a machine of the character described, the combination of a slat-box, a carriage adapted to receive slats in piles and hold the same in position, a hoisting mechanism whereby said carriage may be elevated and the pile of slats thereon raised bodily into said box, and means for automatically receiving the slats from the carriage substantially as set forth.

10. In a machine of the character described, the combination of a series of slat-boxes arranged upon a suitable base and seated over openings therein, a carriage adapted to be driven into said base under said boxes, means for holding slats piled upon said carriage in position to enter said boxes, and hoisting mechanism, substantially as set forth.

11. In a machine of the character described, the combination of a slat-box, a carriage thereunder provided with a yieldingly-supported plate adapted to raise a pile of slats into said box, and means for hoisting said carriage, substantially as set forth.

12. In a machine of the character described, the combination of a slat-box, a carriage having a suitable opening, a centrally-raised spring-supported plate fitted within said opening and adapted to be raised to said box with said carriage, and hoisting mechanism, substantially as set forth.

13. In a machine of the character described, the combination of a carriage, means for holding slats in piles thereon, a slat-box, and means for automatically taking the slats from said carriage into said box while the machine is running, substantially as set forth.

14. In a machine of the character described, the combination of a carriage, rods adapted to hold slats in piles thereon, a slat-box, means for raising the slats on said carriage into said box, and mechanism for taking the slats off said rods, substantially as set forth.

15. In a machine of the character described, the combination of a slat-box with coacting bars notched throughout their length and adapted to take up slats by degrees therein, substantially as set forth.

16. In a machine of the character described, the combination of a slat-box adapted to receive slats having slotted ends, and compressible notched bars passing through and alternately engaging the slotted ends of the slats placed therein, substantially as set forth.

17. In a machine of the character described, the combination with a slat-box adapted to receive and guide slats piled therein and passing therethrough, of movable and stationary bars extending partly up said box, said bars being notched throughout their length and working together to take up said slats as the same are brought in, substantially as set forth.

18. In a machine of the character described, the combination of a slat-box having guides forming suitable divisions therein, oppositely-placed notched bars engaging slats placed in said divisions, and means for working said notched bars collectively, substantially as set forth.

19. In a machine of the character described, the combination of a slat-box, stationary bars fastened to the inner walls thereof, movable bars placed by the side of said stationary bars, both said stationary and movable bars being notched throughout their length, a collar adapted to hold said movable bars, and means for reciprocating said collar, substantially as set forth.

20. In a machine of the character described, the combination of a slat-box, coacting movable and stationary bars adapted to take up slats placed therein, a spring-supported device holding up and controlling the said movable bars, and means for reciprocating said device, substantially as set forth.

21. In a machine of the character described, the combination of a slat-box, movable and stationary bars coacting to take up the slats placed therein, a collar connecting the said movable bars with each other, a spring holding said collar, and a lever adapted to alternately depress and release said spring, substantially as set forth.

22. In a machine of the character described, the combination of a slat-box, stationary and movable bars coacting to take up the slats therein, a collar connecting the movable bars with each other, a forked spring linked to said collar, the branches of said spring extending by the sides of said box, a lever fulcrumed also on the sides of said box and provided with pins arranged to bear upon the said spring branches, a rotary shaft, a cam carried by said shaft, and intermediate connections whereby said lever may be oscillated from said shaft by said cam, substantially as set forth.

23. In a machine of the character described, the combination of a slat-box, slitted bars coacting to take up slats through said box, and cushions inserted into the slits of said bars, substantially as set forth.

24. In a machine of the character described, the combination of a slat-box adapted to receive slats having slotted ends, and compressible coacting bars passing through and alternately engaging the slotted ends of the slats therein, the said bars being notched to form a series of oppositely-laid steps, substantially as set forth.

25. In a machine of the character described, the combination of a framing mechanism, a slat-box adjacent thereto, a table extending entirely over both said framing mechanism and box and leaving a passage between the same, mechanism for taking up slats through said box, and mechanism for expelling said slats successively and automatically from the slat-box into the framing mechanism, through said passage, substantially as set forth.

26. In a machine of the character described, the combination of a framing device, a slat-box adjoining the same, a table extending over said slat-box and said framing device and forming a passage therebetween, and springs partly obstructing said passage, substantially as set forth.

27. In a machine of the character described, the combination of a framing device, a slat-box formed with a suitable passage leading into said device, means for bringing a pile of slats up to said passage, and springs partly obstructing said passage whereby square-cornered slats in the pile will be arrested and allowed to slide only one at a time through the passage, substantially as set forth.

28. In a machine of the character described, the combination of a framing device, a slat-box formed with a suitable passage leading into said device, means for bringing a pile of slats up to said passage, and springs partly obstructing said passage, the said springs being fitted in flaring recesses and adapted to be pushed aside by a wedge-shaped channeled slat covering another slat of lesser width and to thus allow the two said slats to slide together through said passage, substantially as set forth.

29. In a machine of the character described, the combination of a framing device, a slat-box discharging into said device, means for passing slats in piles through said box, the top slat of one pile fitting within the bottom slat of another pile, and a reciprocating bar adapted to drive the said top and bottom slats together into the framing device, substantially as set forth.

30. In a machine of the character described, the combination of framing mechanism, mechanism for driving splints in rows thereto, a slat-holder, means for taking up by degrees the slats in the holder, and a reciprocating bar working alternately with the splint-driving mechanism and operating to discharge the slats from the holder unto the splints in the framing mechanism, substantially as set forth.

31. In a machine of the character described, the combination of framing mechanism, a box open at both top and bottom and arranged to discharge thereinto, bars adapted to automatically receive slats through the bottom end of said box and take them up by degrees to the upper end thereof, a spring working said bars, a reciprocating bar arranged to drive the slats successively from said box to said framing mechanism, a lever actuating both said spring and said reciprocating bar, and means for operating said lever, substantially as set forth.

32. In a machine of the character described, the combination of a framing device, means for holding slats within the same, a table entirely covering said device and provided with a suitable channel leading thereinto, splint-cutters, and mechanism to carry the wooden blocks against said cutters and at the same time drive the splints through the channel in the table unto the slats in the framing device, substantially as set forth.

33. In a machine of the character described, the combination of a framing device, means for holding slats in layers therein, a suitably-apertured table extending over said device, splint-cutters, and mechanism for carrying the wooden blocks in groups against said cutters and driving the splints in successive rows unto the layers of slats in said framing device, substantially as set forth.

34. In a machine of the character described, the combination of friction-slides composed of spring-bars formed into branches with interposed cushions imparting to the same a uniform tension, and means for forcing splint-bearing slats down said slides, substantially as set forth.

35. In a machine of the character described, the combination of a framing-chamber, friction-slides for holding up splint-bearing slats yieldingly therein, and a depressor, substantially as set forth.

36. In a machine of the character described, the combination of a framing device, a slat-box, means for feeding the slats from said box to said device, and a depressor adapted to guide said slats as they are driven from the box to the framing device, substantially as set forth.

37. In a machine of the character described, the combination of a framing device adapted to receive slats and splints to be piled in alternate strata therein, a slat-box discharging into said device, means for loading successively the discharged slats with splints, and a depressor arranged to bear on the splints while the slats are driven in, substantially as set forth.

38. In a machine of the character described, the combination of framing mechanism, a slat-holder, means for discharging loose slats from the holder into the framing mechanism, splint-cutters discharging unto the slats from the holder, and a reciprocating depressor adapted to lower the slats and splints as the same are introduced into the framing mechanism, substantially as set forth.

39. In a machine of the character described, the combination of framing mechanism, a slat-holder discharging into the same, a table thereover, splint-cutters also discharging into said framing mechanism from said table, and a reciprocating depressor fitted within the table over both the slat-holder and framing mechanism, substantially as set forth.

40. In a machine of the character described, the combination of a framing device, a slat-box and splint-cutting mechanism arranged to discharge alternately into said device, a table under the splint-cutting mechanism, and a depressor composed of suitable bars joined together fitting in grooves under the table and extending over both the slat-box and framing device, substantially as set forth.

41. In a machine of the character described, the combination of a framing device, a slat-holder discharging thereinto, splint-feeding mechanism arranged to discharge also into said device, a depressor adapted to guide the slats as they are discharged from the holder, and a cam connected with said splint-feeding mechanism and working said depressor, substantially as set forth.

42. In a machine of the character described, the combination of a framing device adapted to receive slats and splints to be piled in alternate strata therein, a suitably-apertured table, splint-cutters, a depressor located between the table and the framing device and having a spring-arm passing through and extending over the table, and mechanism adapted to feed the splint material to the splint-cutters and comprising a cam arranged to work the depressor alternately with the feed of the splint material, substantially as set forth.

43. In a machine of the character described, the combination of a table, a series of framing devices under the same, a series of adjoining slat-boxes discharging into said framing devices, a series of splint-cutters also discharging into said framing devices from said table, a series of depressors located between the table and the framing devices and boxes thereunder, and a wheel carrying the splint material successively to the cutters and having a series of cams arranged to periodically work the depressors after the splints are cut and discharged and while the slats are being fed thereover, substantially as set forth.

44. In a machine of the character described, the combination of a framing device, means for placing slats therein, means for driving splints in close rows across said slats, a depressor arranged to bear upon and keep said splints in the order that they are driven in, and guiding devices adapted to maintain the slats and splints in the shape in which they are left by said depressor, substantially as set forth.

45. In a machine of the character described, the combination of a table, cutters thereon, mechanism to carry wooden blocks successively against said cutters and drive the splints into a channel running through said table, having a flaring wall connected with said channel, and framing mechanism, substantially as set forth.

46. In a machine of the character described, a framing device provided with guides forming ways adapted to receive splint-bearing slats in parallel piles therein, the said guides being inwardly projected to keep the splints in close rows upon the slats while the said piles are being formed, substantially as set forth.

47. In a machine of the character described, a framing device provided with guides forming ways adapted to receive splint-bearing slats piled up therein, the said ways running parallel for some distance and then gradually diverging so that the splint-bearing slats are first kept close together and afterward gradually separated, substantially as set forth.

48. In a machine of the character described, the combination of a framing device adapted to receive alternate layers of slats and rows of splints, means for arranging said splints symmetrically across said slats and keeping the same in parallel piles and in a compact body for some distance therein, means for separating the symmetrically-arranged piles of splint-bearing slats, and partitions forming compartments adapted to receive the parted piles and space the splints therein preparatory to framing, substantially as set forth.

49. In a machine of the character described, the combination with a framing device adapted to receive slats bearing transversely-laid splints, of beveled ribs and intermediate grooves arranged to meet the ends of alternate splints, substantially as set forth.

50. In a machine of the character described, the combination of a framing device adapted to receive slats bearing close rows of transversely-laid splints, of diverging ribs and grooves arranged to part and shift the splints first endwise and then sidewise along the slats placed therein, substantially as set forth.

51. In a machine of the character described, the combination with a framing device adapted to receive slats bearing close rows of transversely-laid splints, of beveled and diverging ribs with intermediate grooves arranged to meet and work between the ends of alternate splints, whereby the same are shifted both endwise and sidewise, substantially as set forth.

52. In a machine of the character described, the combination of a framing device with spacing devices consisting of ribs and grooves formed on opposite walls therein, the said ribs facing said grooves, substantially as set forth.

53. In a machine of the character described, the combination of a framing device divided into ways adapted to receive splint-bearing slats in parallel piles therein, means for separating said piles preparatory to spacing the splints, and partitions and walls provided with oppositely-placed spacing devices whereby the splints in the several piles contained in the framing device can be spaced simultaneously therein, substantially as set forth.

54. In a machine of the character described, the combination of a framing device with spacing devices consisting of ribs and intermediate grooves, the said ribs and grooves running closely together in parallel planes for a short distance within said framing device, then gradually diverging toward a suitable point therein, and from that point again running in parallel planes, substantially as set forth.

55. In a machine of the character described, the combination of a framing device containing splint-bearing slats having slotted ends and put up in piles therein, spring-capped rods adapted to be inserted through the slotted ends of said slats and to engage with the top slat of each slat-pile, and means for clamping and holding up the bottom slat of each such pile on the lower end of said rods, substantially as set forth.

56. In a machine of the character described, the combination of a framing device arranged to hold splint-bearing slats in piles, rods adapted to be passed through said slats and to engage with the top slat of each slat-pile, and blocks carried by the lower end of said rods and adapted to clamp and hold the bottom slat of the slat-pile thereon, substantially as set forth.

57. In a machine of the character described, the combination of a framing device arranged to hold splint-bearing slats put up in piles therein and having slotted ends, the top and bottom slats of each pile having slots of varying shape, spring-capped rods adapted to be passed through the slotted ends of the slats in each pile, and to engage the top slat thereof, blocks sliding over said rods and brought to bear upon the bottom slat of each such pile, and spring-pressed pawls holding up said blocks, substantially as set forth.

58. In a machine of the character described, the combination of a framing-chamber, devices adapted to clamp and frame splint-bearing slats piled therein, and a carriage arranged to bring said devices into said framing-chamber, substantially as set forth.

59. In a machine of the character described, the combination of a series of framing-chambers, a series of slat-boxes surrounded by and discharging into said chambers, splint-cutters, mechanism operating to load the slats discharged from said boxes with the splints produced by said cutters, carriages adapted to surround the series of slat-boxes at the outlet end of the series of framing-chambers, clamping and framing devices mounted upon said carriages, and hoisting mechanism, substantially as set forth.

60. In a machine of the character described, the combination of a framing-chamber divided into compartments adapted to hold splint-bearing slats having suitably-slotted ends and disposed in piles therein, a carriage, and rods arranged in opposite rows upon said carriage and adapted to be inserted through the piles of slats in said compartments and simultaneously frame and clamp the groups of slat-piles therein, substantially as set forth.

61. In a machine of the character described, the combination of a carriage, clamping-rods inserted into suitable holes therein, clamping-blocks adapted to slide upon said rods and seated over said holes, and means for holding the rods in position on said carriage, substantially as set forth.

62. In a machine of the character described, the combination of a carriage, clamping-rods passing through flaring holes and sockets in said carriage, blocks located over said holes and provided with spring-pressed pawls playing therein, and a plate adapted to engage the lower end of said rods and hold the same on the carriage, substantially as set forth.

63. In a machine of the character described, the combination of a carriage, clamping-rods passed through suitable holes in said carriage, the said rods having a notched end, and a plate having D-shaped openings adapted to engage the notched end of said rods and to hold the same in position within the carriage, substantially as set forth.

64. In a machine of the character described, the combination of a framing device containing a pile of splint-bearing slats, a carriage, rods on said carriage adapted to be inserted through said pile of slats to clamp the same, and mechanism for raising and lowering said rods on the carriage, substantially as set forth.

65. In a machine of the character described, the combination of a framing device containing a pile of splint-bearing slats, a carriage, rods on said carriage adapted to be inserted through said pile of slats to clamp the same, a clamping-plate adapted to engage said rods, and a screw arranged to raise and lower said plate, substantially as set forth.

66. In a machine of the character described, the combination of a carriage, rods mounted oppositely thereon and adapted to be inserted simultaneously through a number of piles of splint-bearing slats to frame and clamp the same, a series of clamping-plates engaging the ends of opposite rods, screws adapted to move said plates to and from said carriage, interconnected sprocket-wheels on said screws, and means for turning said sprocket-wheels, substantially as set forth.

67. In a machine of the character described, the combination of a carriage, a number of rods mounted thereon in opposite rows adapted to be inserted simultaneously through piles of splint-bearing slats disposed in groups and to frame and clamp the same, a series of clamping-plates engaging the ends of opposite rods, screws adapted to move said plates to and from said carriage, sprocket-wheels on said screws, a sprocket-chain connecting said wheels, a main sprocket-wheel and bevel-gearing controlling the movement of said chain, and means for turning said gearing, substantially as set forth.

68. In a machine of the character described, a splint-frame consisting of superimposed slats having slotted ends, the top slat having slots of less width and the bottom slat being provided with an under channel, wedge-shaped rods carrying spring-blades adapted to be passed through the slotted ends of said slats and become engaged with the narrow slotted ends of said top slat, blocks sliding upon said rods and arranged to bear upon said bottom slat within the under channel thereof, and spring-pressed pawls adapted to clutch said rods and hold said blocks thereon, substantially as set forth.

69. A splint-frame consisting of superimposed slats having slotted ends, barbed spring-capped rods passing through said slotted ends and engaging the top slat, blocks sliding upon said rods and arranged to bear upon the bottom slat, and spring-pressed pawls carried by said blocks and adapted to hold the slats together by clutching the rods, substantially as set forth.

70. In a machine of the character described, the combination of framing mechanism, a slat-holder, means for transferring slats in single layers from the holder to the framing mechanism, and means for driving splints over the slats transferred from the holder, substantially as set forth.

71. In a machine of the character described, the combination of a table and splint-cutting mechanism with a series of chutes thereabove having their feed-openings in a small circle and their discharge-openings in a larger circle and lower plane, whereby the splint material is fed down by gravity and spread out before reaching the table and splint-cutting mechanism, substantially as set forth.

72. In a machine of the character described, the combination of splint-cutters with a traveling device having a number of splint-material-carrying channels placed so as to follow one another while in motion and forming groups of closely-adjoining compartments with intermediate spaces of suitable size between each group, substantially as set forth.

73. In a machine of the character described, the combination of a framing device adapted to receive slats and splints to be piled in alternate strata therein, with a depressor having parallel bars arranged to bear upon the splint-loaded slats, hold down the splints thereon, and guide the slats as they come in, substantially as set forth.

74. In a machine of the character described, the combination of framing mechanism with splint-feeding mechanism and a slat-holder discharging into said framing mechanism in directions at right angles one to the other, substantially as set forth.

75. In a machine of the character described, the combination of a framing device, means for placing slats in layers therein, and means for driving successive rows of splints across said slats to form a group of splint-frames in said framing device, the forward rows of splints being driven by the succeeding ones across all the slats in any one layer, substantially as set forth.

76. In a machine of the character described, the combination of a framing device adapted to receive alternately slats and splints to be piled therein, a reciprocating device for feeding the slats, and a rotary device to cut the splints and drive the same across the slats as they are fed in, substantially as set forth.

77. In a machine of the character described, the combination of a framing device containing splint-loaded slats put up in piles to be divided into several frames, and spring-capped rods adapted to be passed through the slats of more than one frame and to engage upon being retracted the top slat of the lower frame through which they are passed, substantially as set forth.

78. In a machine of the character described, the combination of a table, splint-cutters thereon, a splint-material or block-carrying device moving above said table, a slat-holder and framing mechanism located entirely under said table, and mechanism for transferring slats from said holder to said framing mechanism, substantially as set forth.

79. In a machine of the character described, the combination of a slat-holder, means for passing slats therethrough, framing mechanism, means for transferring loose slats from the slat-holder to the framing mechanism, splint-feeding mechanism discharging unto the loose slats transferred from the holder, and means for carrying the splint-bearing slats through the framing mechanism in an opposite direction to that of the slats passing through the holder, substantially as set forth.

80. In a machine of the character described, the combination of a table, splint-cutters at the edge thereof, and a movable chute for the splint material, said chute having its top located in a central position above the table, and at a higher elevation, and its bottom running downwardly and outwardly toward the cutters, substantially as set forth.

81. In a machine of the character described, the combination of splint-cutters with a chute movable toward the same, said chute being divided in the direction of its travel into passages adapted to convey the splint material to and against said cutters, and framing mechanism receiving the splints from the cutters, substantially as set forth.

82. In a machine of the character described, the combination of splint-driving mechanism, a slat-holder, framing mechanism receiving the splints and slats alternately from the splint-driving mechanism and the slat-holder, and spacing mechanism, substantially as set forth.

In testimony whereof I affix my signature in presence of two witnesses.

MARCUS S. LEVÉ. [L. S.]

Witnesses:
HENRY P. TRICOU,
A. H. STE. MARIE.